M. W. FRY.
Coffee-Roaster.

No. 159,405. Patented Feb. 2, 1875.

WITNESSES:
W. W. Hollingsworth
Geo. C. Kemon

INVENTOR:
M. W. Fry
BY
ATTORNEYS.

UNITED STATES PATENT OFFICE.

MICHAEL W. FRY, OF GUYANDOTTE, WEST VIRGINIA.

IMPROVEMENT IN COFFEE-ROASTERS.

Specification forming part of Letters Patent No. 159,405, dated February 2, 1875; application filed January 4, 1875.

*To all whom it may concern:*

Be it known that I, MICHAEL W. FRY, of Guyandotte, in the county of Cabell and State of West Virginia, have invented a new and Improved Coffee-Roaster; and I do hereby declare that the following is a full, clear, and exact description of the same, reference being had to the accompanying drawing forming a part of this specification, in which—

Figure 1:
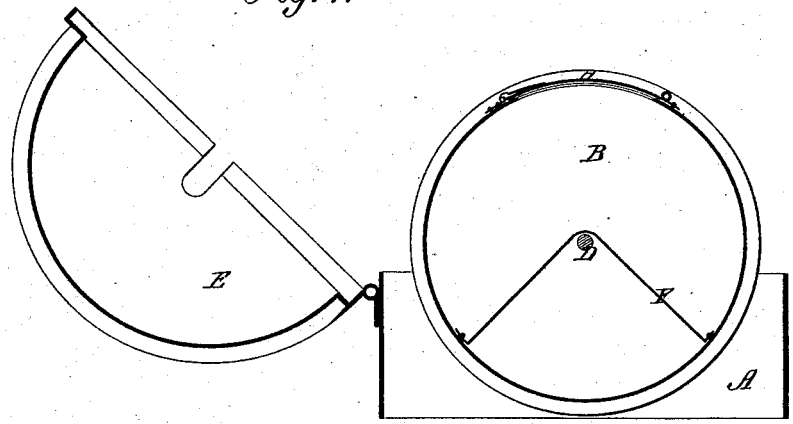
Figure 2:
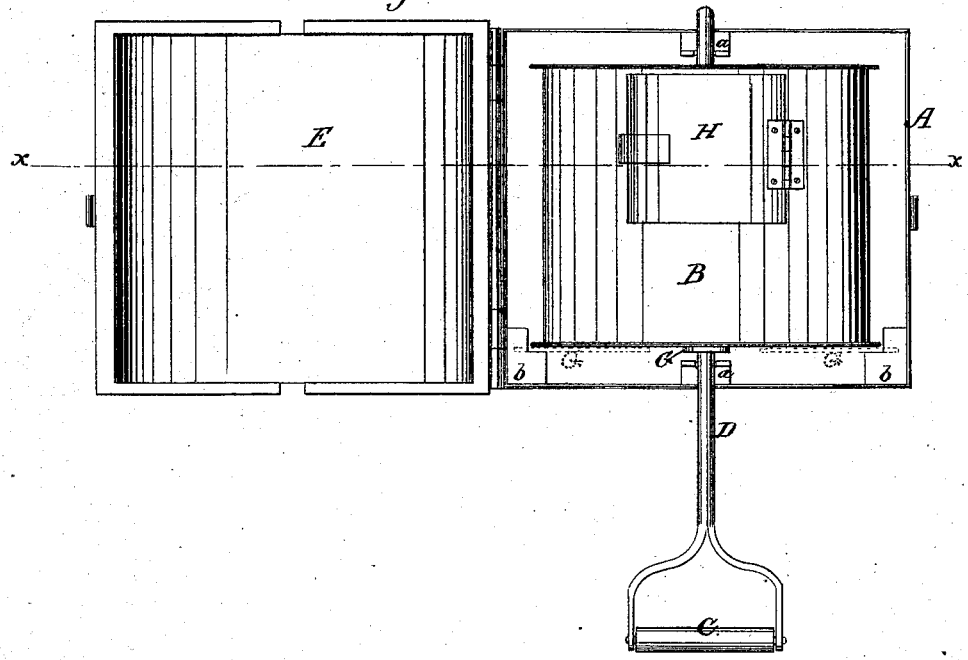

Figure 1 is a vertical section through line $x$ $x$; Fig. 2, a plan view.

This invention relates to certain improvements in coffee-roasters; and it consists in the combination, with a rotary moving cylinder, of a projecting air-chamber upon the inside of the cylinder, which causes the coffee, when passing from one side of the cylinder to the other, to leave the periphery of the same and fall over the obstruction which the projecting air-chamber affords upon the other side of the same, by means of which the coffee is roasted uniformly and prevented from burning. It also consists in the combination, with the said projecting air-chamber, of a stop-pin or plate attached to the cylinder and ledges or flanges attached to the frame, whereby the rotary motion of the said cylinder is limited to a half-revolution.

In the drawing, A represents a square frame having bearings $a$ $a$. B is the cylinder or drum, having attached to it the handle C and the central shaft D, which latter forms journals for the cylinder, and rests in bearings $a$ $a$. E is a hinged cap, which fastens over the frame A and incloses the cylinder B. F is an angular projecting air-chamber upon the inside of the cylinder, formed by a piece of sheet metal bent into proper shape and attached to the inner periphery by rivets. G is an extension-plate, which, as the cylinder is rocked, strikes alternately the two ledges or flanges $b$ $b$, and limits the motion of the said cylinder to half a revolution. H is a hinged door fastened by a clasp, through which the coffee is inserted into the cylinder. As the cylinder is rocked with a half a revolution, the coffee leaves the hot periphery of the cylinder upon one side, and in its passage passes over the cooler surface of the projection, by means of which the temperature of the grains is so modified that all tendency to burn is obviated, the fall of the said grains over the projection bringing new surfaces of the same constantly into contact with the periphery of the cylinder.

Having thus described my invention, what I claim as new is—

1. The projecting air-chamber F, in combination with a rotary coffee-roaster, substantially as and for the purpose described.

2. The combination of the projecting air-chamber F, the extension-plate G, and the ledges or flanges $b$ $b$, substantially as and for the purpose described.

MICHAEL W. FRY.

Witnesses:
J. B. HITE,
WM. M. HOVEY.